July 7, 1970  L. J. BROOKS  3,519,227
MOUNTING MEANS FOR AN AIRCRAFT ENGINE
Filed Oct. 20, 1967  3 Sheets-Sheet 2

Inventor
Leslie John Brooks
By Cushman, Darby & Cushman
Attorneys

July 7, 1970   L. J. BROOKS   3,519,227
MOUNTING MEANS FOR AN AIRCRAFT ENGINE
Filed Oct. 20, 1967   3 Sheets-Sheet 3

Inventor
Leslie John Brooks
By Cushman, Darby & Cushman
Attorneys

United States Patent Office 3,519,227
Patented July 7, 1970

3,519,227
MOUNTING MEANS FOR AN AIRCRAFT ENGINE
Leslie J. Brooks, Aston-on-Trent, Derby, England, assignor to Rolls-Royce Limited, Derby, England, a British company
Filed Oct. 20, 1967, Ser. No. 676,855
Claims priority, application Great Britain, Dec. 30, 1966, 58,269/66
Int. Cl. B64d 29/02
U.S. Cl. 244—55
7 Claims

ABSTRACT OF THE DISCLOSURE

Mounting means for mounting an aircraft engine from adjacent aircraft structure comprises a pod adapted to contain the engine, the pod being mounted from the aircraft structure and there being at least one fence extending from the pod to the aircraft structure to control airflow.

---

This invention relates to mounting means for an aircraft engine.

According to the present invention mounting means for an aircraft engine comprises an engine containing pod mounted from aircraft structure and at least one fence extending from the pod or the aircraft structure adjacent the pod and adapted to effect control of the airflow between the pod and the aircraft structure.

Said pod may be mounted on a fore and aft extending pylon from the aircraft structure which may be a wing surface of the aircraft.

Said pod may be of substantially circular section and there may be two said fences which control the airflow in between the pod and the aircraft structure.

Said fences may extend from said pod to said aircraft structure.

Said engine may be a gas turbine engine and said fences may be positioned to prevent spillage of boundary layer air into the intake of the engine.

Figure 1:
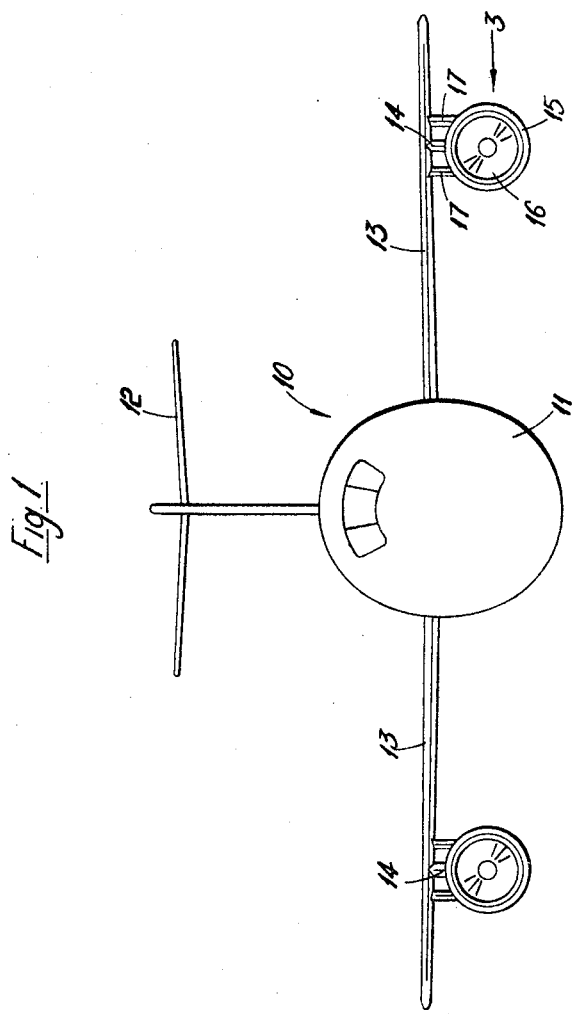
Figure 2:
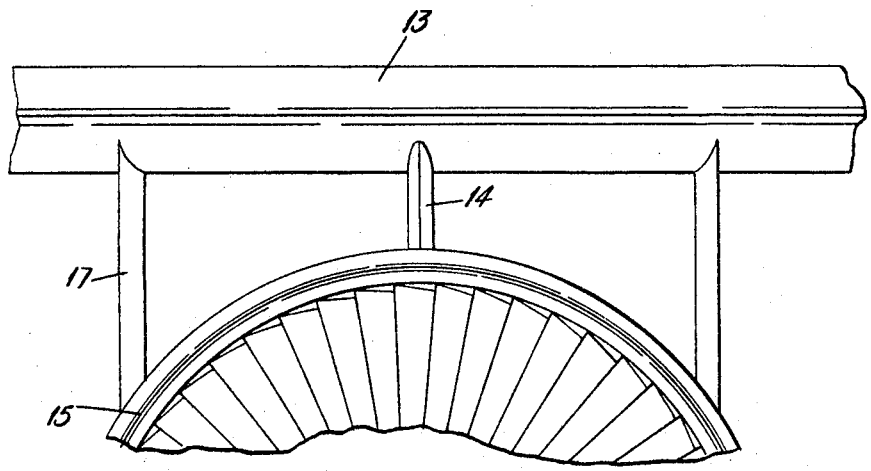
Figure 3:
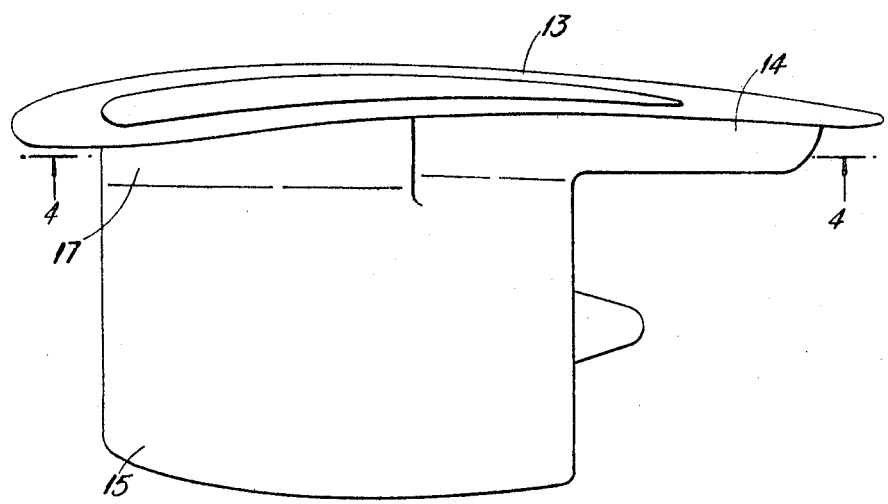
Figure 4:
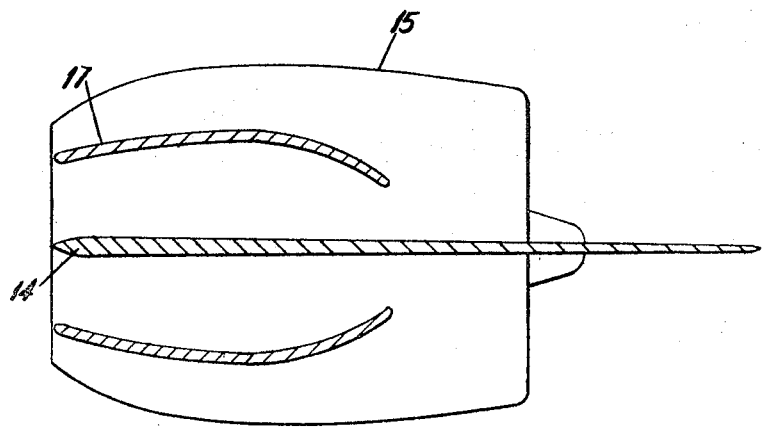

The invention will now be particularly described merely by way of example with reference to the accompanying drawings in which:

FIG. 1 is a front elevation of an aircraft whose engines are mounted according to the invention, FIG. 2 is an enlarged frontal view of the mounting means of the engines of FIG. 1, FIG. 3 is a view on the arrow 3 of FIG. 1, and FIG. 4 is a sectional view on the line 4—4 of FIG. 3.

FIG. 1 shows an aircraft 10 having a fuselage 11, tail structure 12 and wings 13. From each of the wings 13 there is suspended by a pylon 14 a pod 15 which contains a gas turbine engine 16.

In the present instance the engine 16 is a front fan engine having a very large front fan end therefore a large overall diameter. In order to avoid the engines being too close to the ground at take-off and lending and therefore being liable to damage due to ingestion of foreign bodies from the ground, the engines in their pods 15 are mounted as close as possible to the wings 13. Under these circumstances the upper surface of the pod 15 is very close to the lower surface of the wings 13 and therefore undesirable interactions might occur between the boundary layer of the pod 15 and that of the wing 13.

Therefore fences 17 are mounted to extend between the upper surface of the pod 15 and the lower surface of the wing 13. As can be seen from FIGS. 3 and 4 the fences extend fore and aft of the aircraft 10 and lies at either side of the pylon 14, each being slightly curved so as to present a shaped surface to the pylon.

It will be appreciated that the fences 17 can be used to control the adjacent airflow. In effect each fence 17 forms an enclosed duct with the pylon 14, pod 15 and wing 13. The section of the fences 17 is such as to produce a duct which initially contracts at the intakes, increases in area to give a diffusion and finally contracts to form a nozzle, the duct having an overall convergence. Thus interference drag is reduced by the air flow through said duct and is completely calculable. No undue diffusion between wing and pylon and pod will occur.

Again it will be noticed that the intake of the engine 16 lies at the front of the pod 15 and that in the example shown this intake lies to the rear of the leading edge of the wing 13. Therefore if there were no means of controlling the boundary layer on the wing this would tend to spill from the wing into the intake, giving a bad velocity distribution across the intake of the engines 16 and affecting its performance.

The fences 17 in addition to suppressing the boundary layer interference already mentioned provide a way of bleeding off the wing boundary layer by entrainment and preventing spillage of the boundary layer into the intake and preventing any adverse effects due to this spillage.

Although the invention has been described in its application to an engine hung beneath the wing of an aircraft it will be understood that it could equally well apply to engines mounted from the fuselage or other structure of the aircraft. In such cases it might well be unnecessary to provide two fences and only one fence may then be used.

We claim:

1. In an aircraft: aircraft structure; at least one engine; support means for longitudinally mounting said engine closely adjacent to, but spaced from, said aircraft structure; apparatus for controlling of air between said aircraft structure and a surface of said engine adjacent to said aircraft structure, said apparatus comprising at least one fence means extending between said aircraft structure and the adjacent surface of said engine, said fence means being shaped to form, with said aircraft structure and the adjacent surface of said engine, a longitudinally extending duct means open at both ends and having a longitudinal cross sectional area which has an overall convergence, said duct means providing an air flow therethrough, which will prevent interference between boundary layers of the adjacent surface of said engine and said aircraft structure.

2. In the aircraft defined in claim 1 wherein said fence means is shaped as to form in said duct means at least one divergent section intermediate the open ends of said duct means.

3. In an aircraft as claimed in claim 1, wherein said support means is a longitudinally extending pylon which, together with said fence means, aircraft structure, and said adjacent surface of said engine, defines said duct means.

4. In the aircraft defined in claim 3 wherein the portion of said aircraft structure to which said pylon is attached is a wing.

5. In the aircraft defined in claim 3 wherein two of said fence means are provided, one being disposed on each side of said pylon forming two longitudinally extending duct means.

6. In the aircraft defined in claim 4 wherein said engine is of the type having a forward air intake and wherein said engine air intake as disposed rearwardly of the leading edge of said wing, said duct means being adapted to prevent spillage of the boundary layer from said wing into said engine air intake.

7. In the aircraft defined in claim 6 wherein said engine is a front fan engine, said pylon being of a length to prevent said engine from being too close to the ground at takeoff and landing.

References Cited

UNITED STATES PATENTS

| 3,220,669 | 11/1965 | Lewis et al. | 244—53 X |
| 3,270,990 | 7/1966 | Webb | 244—53 |
| 2,403,353 | 7/1946 | Ernest | 244—56 |
| 2,512,794 | 6/1950 | Goddard | 244—55 X |
| 2,936,969 | 5/1960 | Griffith et al. | 244—55 X |
| 3,397,854 | 12/1968 | Reyle | 244—55 |

MILTON BUCHLER, Primary Examiner

J. E. PITTENGER, Assistant Examiner